J. H. DICKINSON.
COMBINED TALKING MACHINE AND PIANO.
APPLICATION FILED MAY 1, 1913. RENEWED SEPT. 20, 1917.

1,314,578.

Patented Sept. 2, 1919.
6 SHEETS—SHEET 2.

J. H. DICKINSON.
COMBINED TALKING MACHINE AND PIANO.
APPLICATION FILED MAY 1, 1913. RENEWED SEPT. 20, 1917.

1,314,578.

Patented Sept. 2, 1919.
6 SHEETS—SHEET 5.

Attest:

Inventor:
J. H. Dickinson
by ... his Atty

UNITED STATES PATENT OFFICE.

JOSEPH H. DICKINSON, OF CRANFORD, NEW JERSEY, ASSIGNOR TO AEOLIAN COMPANY, OF NEW YORK, N. Y., A CORPORATION OF CONNECTICUT.

COMBINED TALKING-MACHINE AND PIANO.

1,314,578.  Specification of Letters Patent.  Patented Sept. 2, 1919.

Application filed May 1, 1913, Serial No. 764,735.  Renewed September 20, 1917.  Serial No. 192,412.

*To all whom it may concern:*

Be it known that I, JOSEPH H. DICKINSON, a citizen of the United States, and resident of Cranford, in the county of Union and State of New Jersey, have invented certain new and useful Improvements in Combined Talking-Machines and Pianos, of which the following is a specification.

This invention relates to improvements in a combined talking machine and player piano and the object of my invention is to provide a new and improved device of this kind which is simple in construction, reliable and effective in use and operation, and in which the movement of the music sheet is so controlled that it will always be brought into proper synchronism with the moving record of the talking machine or phonograph.

In the accompanying drawings in which like letters of reference indicate like parts in all the figures:

Fig. 3 is a vertical transverse sectional view on the line *a—a* Fig. 1.

Fig. 6 is a face view of one of the talking machine disks.

Fig. 18 is a side view and

Fig. 19 an end view of the trip valve operated by the talking machine record support.

Figure 13:
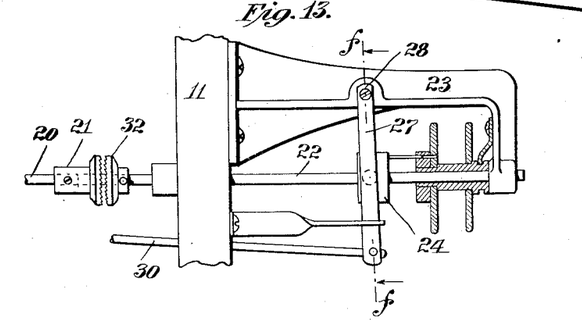
Fig. 13 is a detail side view of the bracket supporting the lever for moving the clutch used for starting the talking machine disk or record.
Figure 14:
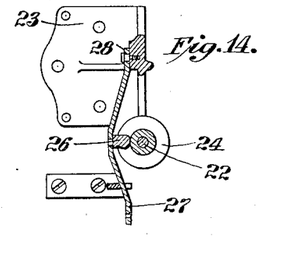
Fig. 14 is a vertical transverse sectional view of the same on the line *f—f* Fig. 13.

The player piano is provided with the casing 1 of conventional type and construction, which casing contains the player mechanism comprising the pumping bellows 2, the pumping pedals 3, the wind chest 4, the striker pneumatics 5, the keys 6, the keybed 7, the tracker 8, the music sheet roll 9, and the music sheet take-up roll 10, all of which may be of conventional construction and require no further explanation. The tracker 8 and the music rolls are contained in the conventional manner in a box or chest 11 above the keys and at the front of the casing, and above this chest and directly below the cover 12 of the casing 1, I provide a compartment 13 which is open at the front and curved at the back so as to adapt it to receive and contain a circular talking machine disk support 14 of the conventional type, which is driven in conventional manner from a spring motor 15, preferably located beneath and suitably supported from the floor 16 of the chamber or compartment 13. The motor is of the well known type of spring motors, used for driving the record disk of a talking machine and need not be described. For the purpose of winding the spring motor a shaft 17 extends from the spring motor horizontally through one of the side walls of the chest 11 and through one of the end partitions of the casing and has a crank 18 at its outer end, so that the spring motor can thus be wound from the exterior of the casing. By means of beveled cog wheels 19 a horizontal shaft 20 is operatively engaged with the spring motor and carries at its free end a clutch member 21. Into said clutch member the free end of a sliding rotative shaft 22 extends which is mounted to slide and rotate in one of the side walls of the chest 11 and in the end of a bracket 23 on said side wall, said shaft carrying a sleeve 24 provided with a circumferential groove, into which a pin 26 extends from a lever 27 pivoted at 28 and having its free end connected by a rod 30 with an arm projecting from the movable board of a pneumatic 31 on a side wall of the chest 11, see Fig. 4. When said pneumatic is collapsed the lever 27 is moved to the left, Fig. 13, and thereby the clutch member 32 on the shaft 22 is engaged with the clutch member 21 on the shaft 20. The shaft 22 is constantly driven from an air motor 33 of the well known construction, in any well known manner, and from this shaft 22 motion is transmitted in any well known manner to the usual music spool or take up spool. Therefore it is clear that when the lever 27 has been moved to the left, from the position shown in Fig. 13 the clutch members 21 and 32 will be engaged and as the shaft 22 is driven from the air motor, the spring motor 15, from which the shaft 20 is rotated, will be, for the time being, assisted by the air motor until such clutch members 21 and 32 are again disengaged in a manner to be described hereinafter.

Figure 1:
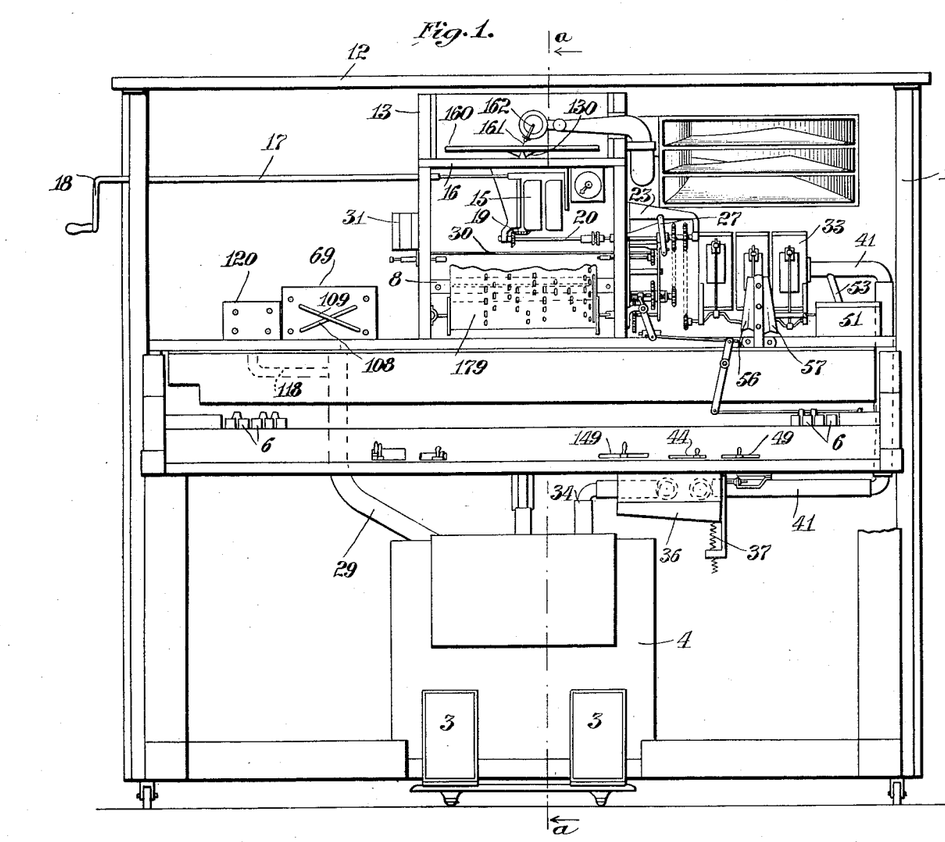
Figure 1 is a front elevation of my improved combined talking machine and player piano.
Figure 11:
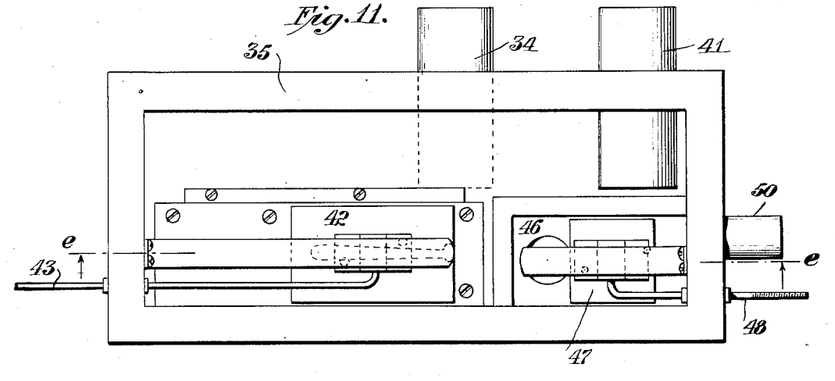
Fig. 11 is a plan view of the box containing two sliding valves for controlling the motor.
Figure 12:
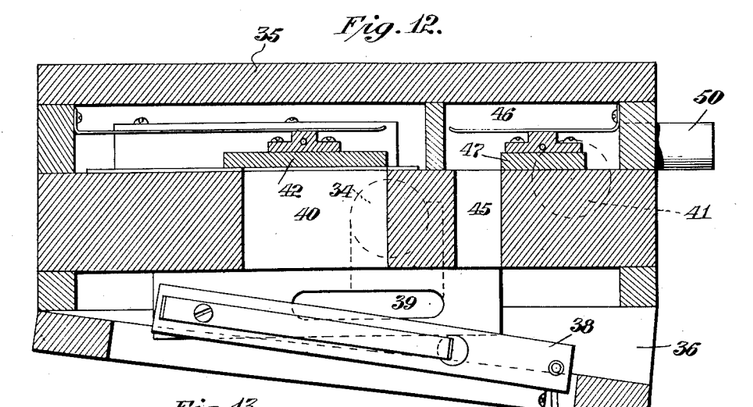
Fig. 12 is a vertical longitudinal sectional view on the line *e—e* Fig. 11.

From the pumping bellows a conduit 34 leads to a chest or box 35 to the bottom of which is secured a regulating bellows 36 which is normally expanded by a spring 37, Fig. 1, in the conventional manner and to the moving board of this bellows is pivoted a knife valve 38 which serves to close, more or less, a port 39 communicating with the tube 34, as shown in Figs. 11 and 12, and the air from the air motor 33 can pass through the tube 41, through said slot 39 and through the port or opening 40 to the top of the chest 35 and from the same through a tube 34 to the wind-chest, the opening 40 being controlled by a slide valve 42 within the chest 35 which slide valve is connected with the rod 43 which in turn is connected with the conventional tempo lever 44 projecting from the front of the piano beneath the keys. The bellows 36 also communicates through a passage 45 with a chamber 46 formed in the chest 35 which passage 45 is controllable by a slide valve 47 and this slide valve is connected with a rod 48, which in turn is operatively connected with a pivoted lever 49, the free end of which is at the front of the piano beneath the keys, all in the conventional manner. The usual rewind lever and its accessories are not shown as they are well known. From the chamber 46 a tube 50 leads to a valve casing 51, Figs. 1, 4 and 17, containing a slide valve 52 which controls said tube 50 and the air can pass from the motor through a branch tube 53 to the casing 51 and from the latter through the tube 50 previously described to the passage 45 and port 39 controlled by the knife valve and through the tube 34 to the windchest. The slide valve 52 in the chest 51 is connected with a rod 54 which in turn is connected with a bar 55 extending transversely across two bellows 56 and 57 and attached to the movable boards of said bellows in such manner that when one bellows collapses the other expands. Said cross bar 55 is provided with a pin or projection 58 between two flat springs 59 and 60 which are substantially parallel and adjacent to each other and extend downward from a block 61 secured to the fixed board 65 between the two bellows 56 and 57 so that when the cross bar 55 moves to the left the left hand spring 59 will be brought into greater tension and when it moves to the right the right hand spring 60 will be brought into greater tension, so that these springs tend to bring both bellows to normal position. When the bellows are in normal position the free ends of the two springs 59 and 60 rest against a stop 62 projecting from the fixed board 65 between the two bellows, below the cross bar 55.

Figures 15, 16, 17:
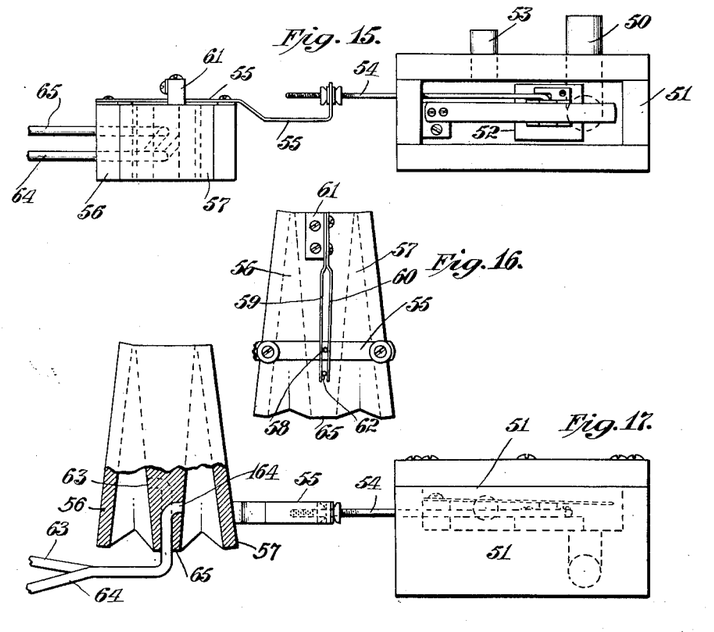
Fig. 15 is a plan view of the double valve shifting bellows and the motor control valve operated by the same.
Fig. 16 is a side view of the double valve shifting bellows.
Fig. 17 is a vertical transverse sectional view, parts being in elevation, through the double valve shifting bellows and a side view of the casing for the motor control valve operated by said bellows.

An air duct or tube 63 leads to the bellows 56 and a similar duct or tube 64 leads to the bellows 57 as shown in Fig. 17, the ends of said ducts being held in the fixed board or block 65 between the bellows, by means of which block the bellows are held in upright position as shown on the right hand side of Fig. 1.

Figures 4, 5:
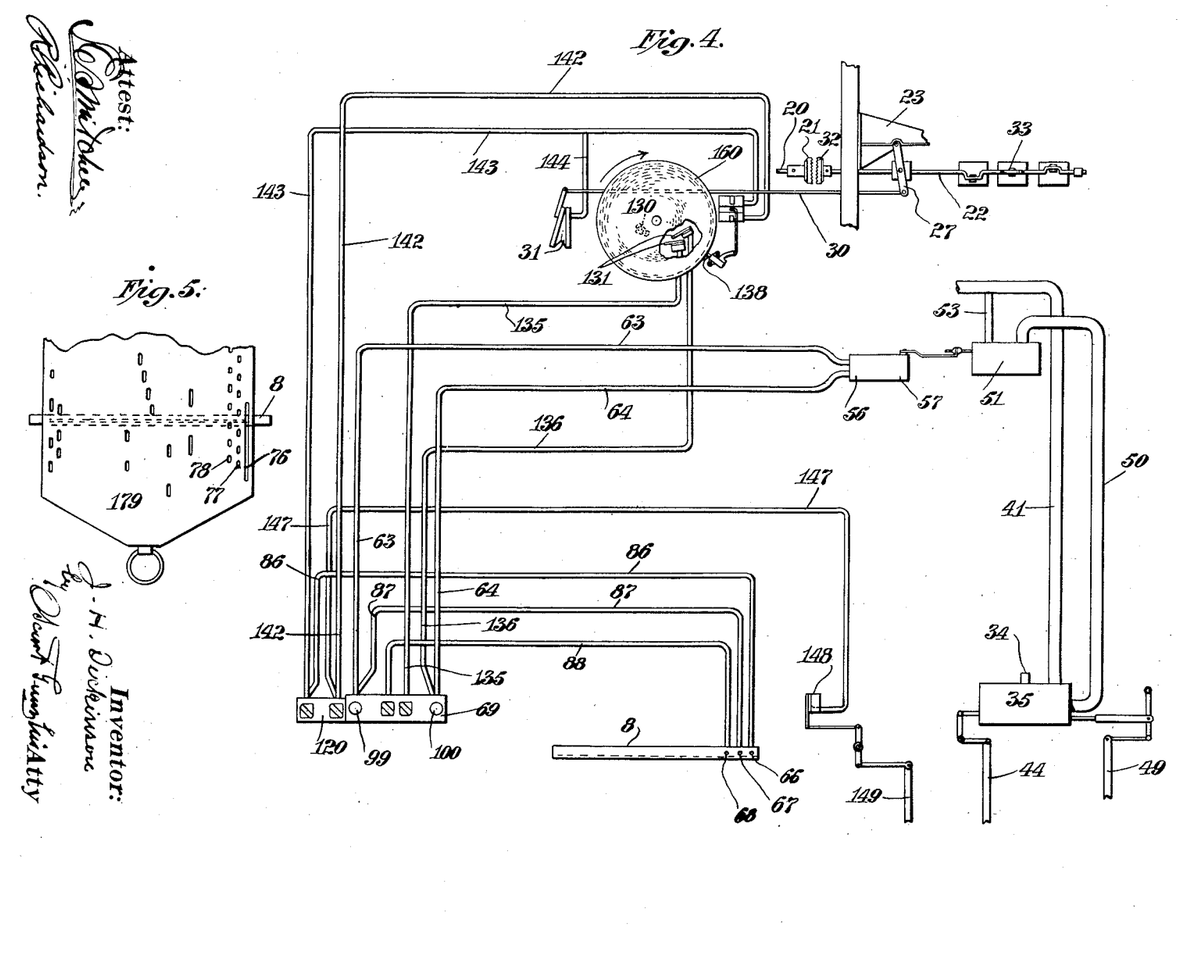
Fig. 4 is a diagrammatic plan view of the mechanism.
Fig. 5 is a face view of part of the perforated music sheet and a front view of the tracker.

The tracker 8 is provided with the conventional ducts for the striker pneumatics and in addition is provided at one end, preferably the right hand end, with three supplementary ducts or holes 66, 67, 68, (Fig. 4) adapted to register with the apertures or slots in the three rows 76, 77 and 78, in the perforated music sheet 179, Fig. 5. In the row 76 there is only one long slot at the beginning of the piece, as indicated and in the rows 77 and 78, the slots follow at regular intervals and alternately in the two rows as will be further explained hereinafter. Tubes 86, 87 and 88 are connected with the holes or ducts 66, 67 and 68 respectively, for purposes that will be described hereinafter. In Figs. 7, 8, 9 and 10 is shown the valve chest 69 having a chamber 70 connected by a tube 29 with the exhausting bellows or device, so that the air is rarefied in said chamber.

In the bottom of the chamber 70 and near the center there are two recesses 71 and 72 covered by pouches 73 and 74, respectively, which carry valve stems 75 and 79, respectively, and these valve stems carry the valves 80 and 81 respectively, which valves are double valves and can seat on the seats 82 above them or on the seats 83 beneath them. The recesses 71 and 72 are connected by ducts and necks 84 with tubes 88 and 135 (Fig. 4) respectively. In the bottom of the chamber 70 in the chest 69 two recesses 89 and 90 are formed, near the ends of the chest, and are covered by pouches 91 and 92 respectively, on which pouches valve stems 93 and 94 respectively rest, and these valve stems pass through ports 95 and 96 which ports can be closed at the outer and inner ends by means of the valves 97 and 98 on the stems 93 and 94 and the top valves 99 and 100 on the upper ends of said stems. By means of necks 101 connected with the ports 95 and 96 these ports are connected with the tubes 63 and 64 (Fig. 4) respectively, which tubes, as stated above, lead to bellows 56 and 57. In the lower part of the chest 69 chambers 102 and 103, respectively, are formed below each recess 89 and 90 and in each chamber 102 and 103 a pouch or diaphragm valve 104 is secured which can seat on a neck 105 in the bottom of each chamber 102—103. In each neck a duct 106 is formed which terminates in a nozzle 107, which by a tube 108 and a tube 109, Fig. 7, respectively, is connected with an elbow neck 110 leading to a duct 200 (Fig. 8) communicating with the recess 89 or 90 on the opposite end of the chest. That part of each chamber 102 and 103 above the pouch 104 is connected by ducts 85 with the port 95 or 96 directly above it, as shown in Fig. 8. That part of each chamber 102, 103 beneath the pouch in said chamber is connected by a duct with a neck 111 with which the tubes 87 and 136 are connected. The chest 69 is also provided with two chambers 114 from each of which a duct 115 leads upward to the ports or passages in which the valves 80 and 81 respectively are located so that according to the position of the valves 80 and 81 said chambers 114 are either connected with atmospheric air or with rarefied air in the chamber 70. Each chamber 114 contains a pouch valve 113 which can close the lower end of a duct 116 which connects that part of the chamber 114 above the diaphragm with the chamber 70. A duct 117 extends from that part of the chamber 114 above the pouch valve 113 to the recesses 89 and 90 respectively, in the floor of the chamber 70.

Figure 7:
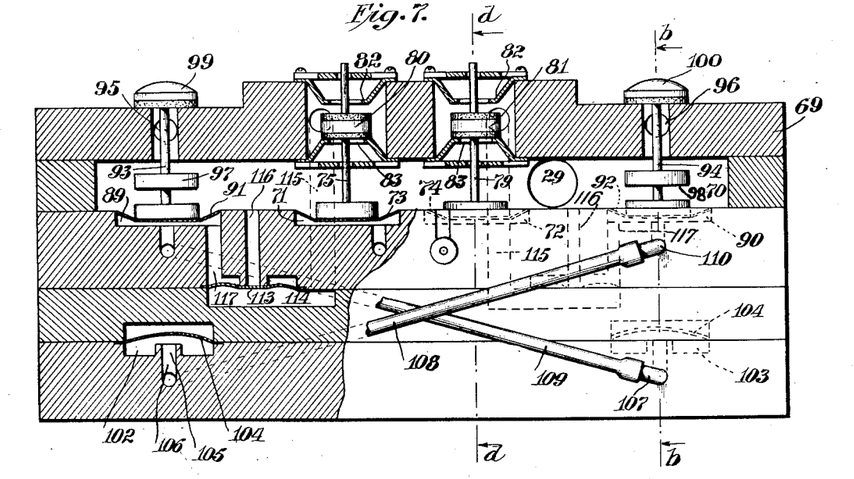
Fig. 7 is a longitudinal vertical sectional view of the valve box for the valves for controlling the speed regulating mechanism, parts being broken away and parts in section.
Figure 8:
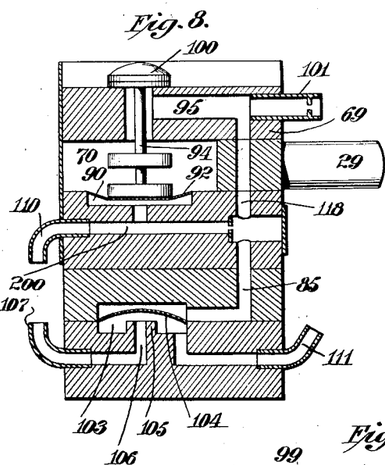
Fig. 8 is a vertical transverse sectional view on the line *b—b* Fig. 7.
Figure 9:
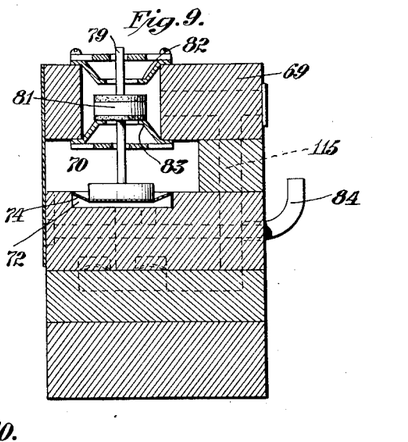
Fig. 9 is a vertical transverse sectional view on the line *d—d* Fig. 7.
Figure 10:
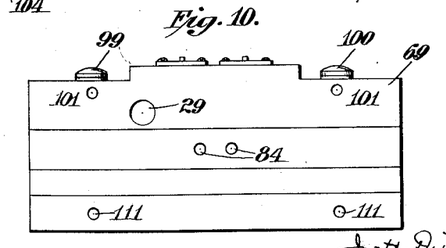
Fig. 10 is an elevation of this valve box.

When the parts are in normal position, as shown in Figs. 7, 8, 9, that part of each chamber 102 and 103 above its pouch valve is in communication with the chamber 70 containing the rarefied air and thus the pouch valves 104 in both chambers 102 and 103 are raised as shown in Fig. 8.

If now atmospheric air is permitted to pass through the neck 111 into the chamber 102 or 103 it can pass through the same, through the duct 106 to the neck 107 and then through the inclined tube 108 or 109 to the corresponding neck 110 and into the recess 89 or 90 whereby the corresponding valve stem 93 or 94 is raised, as are also the valves on said stem, thus permitting atmospheric air to pass into the port 95 or 96 and the neck 101, and either through the tube 63 or 64 to the bellows 56 or 57. At the same time atmospheric air passes through the duct 118 into the recesses 89 or 90 so as to maintain and lock the valve stem that has been raised in raised position, even after the passage of air through the neck 111 has ceased and thus the valve stem 93 or 94 that has been raised remains raised until the adjacent valve stem 75 or 79, Fig. 9, has been raised by atmospheric air passing into the recess beneath its stem through one of the ducts 84. When a valve stem 75 or 79 is raised the corresponding valve 80 or 81 is raised and the chamber 114 through the duct 115 is connected with the rarefied air chamber 70 and the corresponding pouch 113 drops, permitting the air from beneath the pouch or diaphragm of the valve stem 93 or 94 that has been raised to be exhausted through the ducts 116 and 117 into the chamber 70 and thus the valve drops. As soon as the supply of air to the recess 71 or 72 ceases these recesses are exhausted through the ordinary bleed holes and the valve stem 75 or 79 drops and the parts are again in normal position.

It is thus clear that when air is admitted to the chamber 103 at the right hand end of the chest 69, Fig. 7, the valve stem 93 and its valves at the left hand end of the chest will be raised and atmospheric air admitted to the mechanism connected with the neck 101 controlled by this valve and likewise when air is admitted to the neck 111 at the left hand end of the valve chest the valve stem 94 at the right hand end will be raised and atmospheric air admitted to the mechanism controlled by this right hand valve.

Likewise either of these valves that has been raised by air admitted in the manner described remains raised until the adjacent valve stem 75 or 79 is raised by admission of air into the recess beneath its pouch, whereby the air from beneath the pouch of the valve that has been raised is exhausted and the parts brought back to their normal position.

Figure 20:
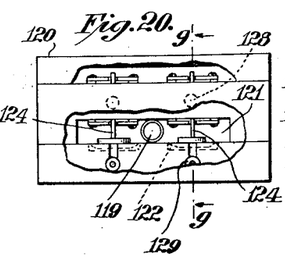
Fig. 20 is a side view of the valve chest for the valves which control the starting and stopping of the talking machine record.
Figure 21:
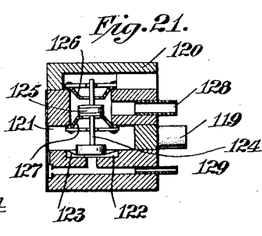
Fig. 21 is a vertical transverse sectional view of the same on the line *g—g* Fig. 20.

The valve chest 120 shown in Figs. 20 and 21 has a chamber 121 and a neck 119 from which a suitable tube 118 may lead to an air exhausting device, so that the air is rarefied in this chamber 121. In the bottom of the chamber there are two recesses 122 each closed by a pouch 123 carrying a valve stem 124, in turn carrying a double valve 125 which can seat, when raised, on the seat 126 and when lowered on the seat 127. Between the two seats a passage is formed which is provided with a neck 128 to which a tube may be attached for operating some mechanism. A separate tube 129 leads to each recess 122. When a valve 125 is raised the tube connected with the corresponding neck 128 is connected with the exhaust air in the chamber 121 and when the valve 125 is lowered the tube connected with the corresponding neck 128 is connected with the atmosphere.

Figure 2:
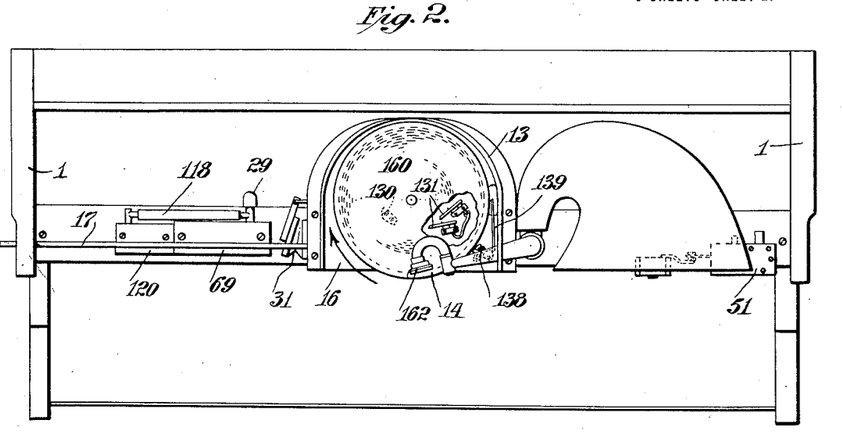
Fig. 2 is a plan view of the same, the top cover of the piano casing being removed.

On the underside of the rotative support 14 for the talking machine disk a beveled block or tappet 130 (Figs. 1 and 2) is secured which, as the support 14 rotates in the direction of the arrow Fig. 2 successively strikes against two levers 131 each pivoted at 132 to a block 133 (Figs. 18 and 19,) thereby raising these ends of the levers opposite those struck by the tappet and thereby raising a valve 134 attached to that end of each lever 131 opposite the one in the path of the tappet 130. These two valves 134 close the ends of tubes 135 and 136 (Fig. 4) respectively, the ends of which tubes are secured in said blocks. Those ends of the levers carrying the valves 134 are normally held in closed position by a spring 137 acting on the same. A brake 138 (Fig. 3) mounted in conventional manner adjacent to the edge of the rotating support 14 for the talking machine record is provided with an arm 139 which extends down between arms 148 of two bellows 141 so that when one bellows is exhausted the arm 139 is moved in one direction and when the other bellows is exhausted it is moved in the reverse direction. These bellows 141 are connected by tubes 142 and 143 with the necks 128 of the valve chest 120, shown in Figs. 20 and 21 and the bellows 31, Fig. 4, previously mentioned is connected by a branch tube 144 with the tube 143. The end of the tube 147, Fig. 4, is normally closed by a valve 148 like that shown in Figs. 18 and 19 which valve can be opened by means of the pivoted lever 149 which extends to the front of the piano below the keys.

Figures 3, 6, 18, 19:
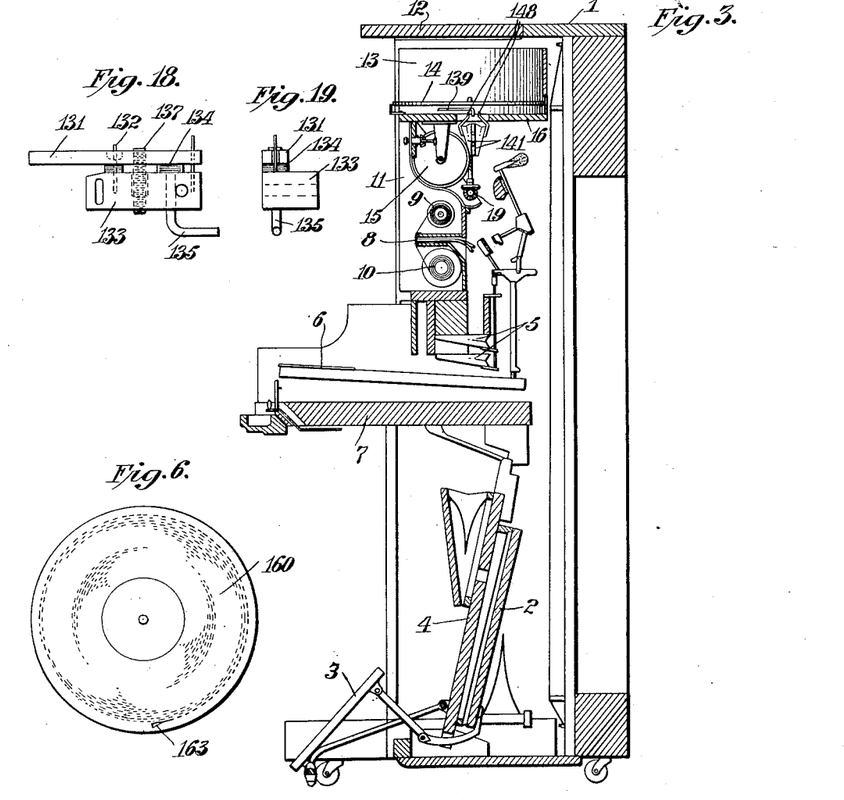

The tube 88 from the tracker leads to the left hand neck and duct 84, Fig. 7, in the chest 69. The tube 87 leads from the tracker to the left hand bottom neck 111 of the chest 69. The tube 86 leads from the tracker to the left hand neck and duct 129 in the chest 120, and the tube 147 leads from the valve 148 to the right hand neck and duct 129 in the chest 120. The tube 63 leads from the bellows 56 to the left hand duct and neck 101 of the chest 69 and the tube 64 leads from the bellows 57 to the right hand neck and duct 101 of the chest 69. The tube 136 leads from a valve 134 such as shown in Fig. 18 and located beneath the talking machine record support 14 to the right hand neck 111 and passage of the chest 69 and the tube 135 leads from a like valve 134 beneath the talking machine record support to the duct 84 of the right hand valve 81 of the chest 69. The tube 142 leads from one of the bellows 141 to the right hand neck and duct 128 of the chest 120 and the tube 143 leads from the other bellows 141 and from the bellows 31 to the left hand neck and duct 128 of the chest 120.

When the player piano is to be used without the talking machine disk the lever 49 is shifted so as to cause the valve 47, Fig. 12, to close the passage or port 45 from the regulating bellows 36 into chamber 46 as this part of the mechanism is now not required. The tempo of the motor is controlled by means of the lever 44 in the well known manner, which lever is used for shifting the tempo valve 42 controlling the passage of air through the passage or port 40.

When the player piano is to be used in connection with the talking machine record the ordinary tempo lever 44 is shifted so that the valve 42 completely closes the passage or port 40, Fig. 12, and all the air must pass from the motor to the pumping bellows through the tube 53, Fig. 4, the valve chest 51 and the tube 50, through the passage or port 45 controlled by the valve 47 which valve 47 is adjusted to the predetermined speed of the note sheet by means of the lever 49, which speed normally is about 8 ft. per minute, equivalent to 80 on the tempo scale of the player piano record. A phonograph disk 160 is placed on the support 14 in such a manner that the pin or stylus 161 on the sound box 162 rests in the cavity 163 in said disk 160 and the perforated music sheet 179 is so adjusted that the beginning of the slot 76 is just above the hole or duct 66 in the tracker. The pumping bellows are operated either by foot or by power and the sheet 179 begins to move. As soon as the forward end of the slot 76 registers with the hole 66 air is admitted into the tube 86 and raises the corresponding left hand pouch 123 whereby the left hand valve 125, Figs. 20 and 21, is raised and the air is exhausted from the tube 143, the bellows 31 and one of the bellows 141 causing the arm 140 of this bellows to move the arm 139 of the brake 138 in such a manner as to disengage the brake from the record support which is thus released. At the same time the bellows is collapsed and the clutch members 21 and 32 are engaged so that the shaft 20 is now rotated from the wind motor 33 which assists the spring motor 15 thus giving the greater power which is required for quickly starting the record or disk. The parts are maintained in this position until the rear end of the slot 76 has passed the hole 66 in the tracker whereupon the air is exhausted through the ordinary bleed hole from beneath the left hand pouch 123 permitting the valve 125 to drop and atmospheric air now passes through the tube 143 permitting the bellows 31 to expand under the action of its usual spring whereby the clutch members 21 and 32 are disengaged and the talking machine record disk is now driven by the spring motor only. At the same time the bellows 141 that was exhausted is permitted to expand under the action of its spring but without acting on the brake 138 which is held in the adjusted position by a spring latch, usually provided thereon and forming no part of the present invention. For each revolution of the record support the tappet 130, in rapid succession, strikes the free ends of the two levers 131 each carrying a valve 134 for closing a tube 135 and 136 as described. As this support rotates in the direction of the arrow, Fig. 4 it will be seen that the valve 134 for the tube 136 is first opened and immediately thereafter the valve 134 for the tube 135, and so on for each rotation of the record or disk support. When the valve 134 of the tube 136 is opened, although only for an instant, air is admitted into the tube 136 and from the same into the right hand neck 111 in the chest 69, Fig. 7, and then through the chamber 103 in the manner described, through the pipe 109 into the chamber 89 whereby the valves 97 and 99 are raised and held elevated until, as explained later, the chamber 89 is exhausted by the tracking of the second sheet perforation 78. Atmospheric air is now permitted to pass into the corresponding neck 101 and through the tube 63 into the bellows 56 (Fig. 17) which is expanded, that is its movable board is moved to the left and the bellows 57 is collapsed correspondingly. Thereby the valve 52 is moved to the left and the speed of the air motor is increased. Thereafter the valve 134 on the end of the tube 135 is opened and air is admitted beneath the pouch in the recess 72 whereby the valve 81 is raised but without any effect as the valves 98 and 100 are already lowered. With the closing of said valve 134 the valve 81 immediately resumes its normal position.

When thereafter an aperture in the row 77 of the perforated music sheet 179 registers with the tracker hole 67, atmospheric air is admitted into the tube 87 and to the left hand neck 111 of the chest 69 but without any effect as it cannot pass through the left hand chamber 102 for the reason that when the valves 97 and 99 were raised, as just described above, atmospheric air was thus admitted not only into the tube 63 to expand the bellows 56 but was also admitted through the ducts 118 and 85 into the upper part of the chamber 102 and acting on the pouch 104 seated the same on the neck 105, thus preventing the atmospheric air admitted into the tube 87 from passing any farther and producing any action on the valves 98 and 100, which it would raise, if it were not checked by the lowered pouch 104 in the left hand chamber 102. Instantly after an aperture in the row 77 of the music sheet 179 has registered with the tracker hole 67 an aperture in the row 78 of the music sheet registers with the hole 68 in the tracker and atmospheric air is admitted into the tube 88 and the valve 80 is raised and the space below the pouch 91 is exhausted causing the valves 97—99 to drop and the air-motor speed to drop to normal. Also the space in the chamber 102 above the pouch 104 is exhausted, thus again restoring it to normal so that when occasion arises atmospheric air from the left hand neck 111 relating to the first sheet perforation 77 can pass through the left hand chamber 102 and the tube 108 to the recess 90, to operate the valves 98 and 100. The foregoing description of operation assumed that the phonograph-record and music-sheet were out of synchronism with the former leading; and I have shown how the music-sheet motor is given an increment of speed between the time that the first phonograph-record-valve is opened and the second music-sheet perforation 78 reaches its tracker-duct. In the same way each succeeding rotation of the phonograph-record speeds the music-sheet during the same foregoing interval until it is brought into synchronism with the phonograph-record.

It will be understood that the apertures 77 and 78 are arranged in groups, that is one aperture 77 and one aperture 78 in each group, the aperture 78 directly following the aperture 77 and the groups are spaced a distance corresponding to the time of travel of the music sheet during a rotation of the record disk 160, so that when the music sheet 179 and the record disk are traveling synchronously the valve 134 of the tube 136 will be opened substantially at the same instant that an aperture 77 registers with the tracker hole 67 and the valve of the tube 135 will be opened substantially at the same instant that an aperture 78 registers with the tracker hole 68.

If the reverse of the above assumed condition should occur, namely that the music sheet 179 begins to get out of synchronism with the phonograph-record by traveling too fast and an aperture 77 of the music sheet arrives at the tracker hole 67 some time before the valve 134 of the tube 136 is opened, by the action of the tappet 130, then the following takes place:

Atmospheric air is admitted through the left hand neck 111 of the chest 69, Fig. 7, and the valves 98 and 100 are locked in raised position and atmospheric air is admitted into the tube 64, the bellows 57 is expanded and the valve 52 moved to the right, causing the air motor 33 to now run a trifle slower. Instantly thereafter the corresponding aperture 78 registers with the tracker hole 68 and atmospheric air is admitted beneath the pouch 73, and the valve 80 is raised and then lowered but without effect as explained. If now the valve 134 of the tube 136 is opened by the tappet 130 atmospheric air passes to the right hand neck 111 of the chest 69, Fig. 7, but cannot pass any farther because by the previous raising of the valves 98 and 100 (see above) the pouch 104 corresponding to the right hand neck 111 has been seated on the neck 105. Instantly after the valve 134 of the tube 136 has thus been opened the valve 134 of the tube 135 is opened and atmospheric air admitted beneath the pouch 74 and the valve 81 is raised and the ducts 115 and 117 are brought into communication with the rarefied air space 70, the right-hand pouch 113 drops and through the ducts 116 and 117, the air is exhausted into the space or chamber 70 from beneath the pouch 92 with the result that the valves 98 and 100 descend and the bellows 57 is exhausted and by its spring is brought to normal position whereby the valve 52 is moved slightly to the left and the air-motor speed brought to normal. The dropping of said valves 98—100 also connects the exhaust with the space above the right-hand pouch 104 in Fig. 7 and restores it to normal. It will thus be seen that if, for example, the perforated music sheet travels too fast its speed is checked and immediately thereafter the speed of the music sheet is again brought to normal.

If the perforated sheet is still in advance of the record disk, the above operation is repeated for one or more successive rotations of the record disk, that is, until synchronism is established.

It will be observed that when the motor control valve 52 has been adjusted from the perforated music sheet to cause the motor to run slower, the motor is not affected by the immediately following opening of the valve 134 of the tube 136 by the tappet 130, but the opening of the valve 134 of the second tube 135 causes the speed of the motor to return corresponding to normal.

As stated above it may take one or more rotations of the record disk and corresponding movements of the perforated music sheet to attain perfect synchronism.

When perfect synchronism has been obtained and is maintained atmospheric air is admitted into the tubes 87, 88, 135 and 136 for each rotation of the record disk and corresponding travel of the perforated music sheet, with the following effect or results:

The valve 134 of the tube 136 is opened substantially at the same instant an aperture 77 in the perforated music sheet registers with the tracker hole 67 and thus air is admitted at the same time to both bellows 56 and 57 and consequently no movement of the valve 52 takes place and there is no change in the speed of the motor. Immediately thereafter the valve 134 of the tube 135 is opened and at the same time an aperture 78 of the sheet 179 registers with the tracker hole 68 and both bellows 56 and 57 are exhausted at the same time and no movement of the same takes place and there is no change in the speed of the motor. In the manner previously described both pouches 104 are relieved of air pressure and so on.

When the piece has been played and the perforated music sheet is to be rewound the lever 149 is moved to the right to open the valve 148 and admit atmospheric air into the tube 147 so as to collapse that bellows 141 which throws the brake 138 against the rim of the support 14 in which position the brake is held by the usual locking mechanism provided on the same.

No claim is intended to be made in the present application for the means for coupling the sheet motor with the record disk motor to start the latter or for the means for adjusting the record disk.

Having described my invention what I claim as new and desire to secure by Letters Patent is:—

1. The combination with two independent sound producing instrumentalities, a movable controlling record for each, and an independent motor for each instrumentality for moving its record, of a means controlled in the operation of both of said records for varying the speed of one of said motors from normal speed, and means also controlled in the operation of both of said records for bringing the speed of the adjustable motor back to normal, immediately after its adjustment to a speed other than normal.

2. The combination with two independent sound producing instrumentalities, a movable controlling record for each, and an independent motor for each instrumentality for moving its record, of a means controlled in the operation of both of said records for varying the speed of one of said motors from normal speed, means for automatically locking the said motor adjusting means immediately after the operation for varying the speed of the motor from normal, and means also controlled in the operation of both the said records for unlocking the speed adjusting means and thereupon operating the speed adjusting means of said motor to bring the speed of the motor to normal.

3. The combination with two independent sound producing instrumentalities, a movable controlling record for each, and an independent motor for each instrumentality for moving its record, of a means controlled in the operation of both of said records for varying the speed of one of said motors from normal speed, and comprising two ducts for motive force, controlled by one of the records and two other ducts for motive force, controlled by the other record, a series of valves operatively connected with said ducts, and controlling the means for changing the speed of the motor in the one of said instrumentalities from normal.

4. The combination with two independent sound producing instrumentalities, a movable controller record for each, and a motor for each instrumentality for moving its record, of a means controlled in the operation of both of said records for varying the speed of one of said motors from normal speed, comprising two ducts controlled by one record and two ducts controlled by the other record, said two ducts of one record being controlled successively by said record and the two ducts pertaining to the other record being also controlled successively by said other record, a series of valves controlled by said ducts, and controlling the means for varying the speed of the one of said motors from normal.

5. The combination with two independent sound producing instrumentalities, a movable controlling record for each, and a motor for each instrumentality for moving its record, of a means controlled in the operation of both said records for changing the speed of one of said motors from normal speed, comprising means for locking the speed changing devices after adjustment from one record against adjustment from the other record, and also comprising means for again releasing the locked speed adjusting means before they are subjected to a speed varying action controlled by either record.

6. The combination with two independent sound producing instrumentalities, a movable controlling record for each, and an independent motor for each instrumentality for moving its record, of a means controlled in the operation of both of said records for varying the speed of one of said motors from normal speed, comprising two ducts controlled from one record and two ducts controlled from the other record, a valve chest, valves therein, controlled by the said four ducts, and two ducts leading from the valve-chest to the means for varying the speed of the motor.

7. The combination with two independent sound producing instrumentalities, a movable controlling record for each, and an independent motor for each instrumentality for moving its record, of a means controlled in the operation of both of said records for varying the speed of one of said motors from normal speed, said means comprising two ducts, means on one record for successively controlling said ducts, two additional ducts, means on the other record for controlling said two additional ducts successively, a valve-chest, valves in said chest, which are operatively connected with said ducts, two ducts leading from the valve-chest to a controlling device for the motor of one of the instrumentalities, said last two ducts being under control of valves in said chest, and means in said chest for automatically locking all valves in said chest against operation from either record, and means for unlocking the locked valves, which unlocking means are controlled from a record other than the one which causes the locking of the same.

8. In a pneumatically operated musical instrument, the combination with a double acting instrumentality, such, for example, as the bellows 56—57, of two ducts leading to said instrumentality, a valve-chest with which said ducts are independently connected, a main valve in said valve-chest for each duct, for controlling the admission of air into or the exhaustion of air from said ducts, a pneumatic means for each main valve for operating the same, a duct for each of said valve operating devices, a locking valve in each duct for the above mentioned main valves, and a releasing valve for each main valve, and a duct for each releasing valve.

9. In a pneumatically operated musical instrument, the combination with a double acting instrumentality, such, for example, as the bellows 56—57, of two ducts leading to said instrumentality, a valve-chest with which said ducts are independently connected, a main valve in said valve-chest for each duct, for controlling the admission of air into or the exhaustion of air from said duct, a pneumatic means for each main valve for operating the same, a duct for each of said valve operating devices, a locking valve in each duct for the above mentioned main valves, and a releasing valve for each main valve, and a duct for each releasing valve, the locking valve pertaining to each main valve being under control of the other main valve, as distinguished from the main valve to which said locking valve pertains.

10. The combination of independent moving records, a speed adjustable motor for driving one of them, means for each record operable periodically thereby and connected with the said speed adjustable motor to affect its speed, each means having the opposite effect of the other on said speed, and means whereby whichever of said first means is operated first during a given period, the other is prevented during that period from affecting the speed of the motor.

11. The combination of independent moving records, a speed-adjustable motor for driving one of them, motor speed adjusting means operable periodically by each record and connected with the speed-adjustable motor to affect its speed until released, each means having the opposite effect of the other on said speed means whereby, whichever of said first means is operated first during a given period, the other is prevented during that period from affecting the speed of the motor, and means for each record operable periodically thereby subsequent to the motor-speed adjusting means of the same record and acting upon the motor-speed of the other record to release it.

12. The combination of independent moving records, a speed-adjustable motor for driving one of them, motor-speed adjusting means operable periodically by each record and connected with the motor to affect its speed until released, each means having the opposite effect of the other on said speed, and means whereby whichever of said first means is operated first during a given period, the other is prevented during that period from affecting the speed of the motor, and means for each record operable periodically thereby to release the motor-speed adjusting means of the other record.

13. The combination of independent moving records, a speed-adjustable motor for driving one of them, means for each record operable periodically thereby and connected with the speed-adjustable motor to affect its speed, each means having the opposite effect to the other on said speed, and means whereby whichever of said first means is operated first, the other is prevented from being operated.

14. In synchronizing apparatus, the combination of moving records adapted to be operated in synchronism, one of said records being controllable to travel faster and slower than its normal synchronous speed, means operable at intervals by one of the records to move the controllable record faster, means operable at corresponding intervals by the other record to move the controllable record slower; and means, operated along with the aforesaid means, which, when operated with either of them during a given interval, prevents the aforesaid operation of the other during that interval.

15. In synchronizing apparatus, the combination of moving records adapted to be operated in synchronism, one of said records being controllable to travel faster and slower than its normal synchronous speed, means operable at intervals by one of the records to move the controllable record faster, means operable at corresponding intervals by the other record to move the controllable record slower, said means being adapted to neutralize each other, when operated simultaneously due to the records being in synchronism; and means, operated along with the aforesaid means, which, when operated with either of them during a given interval, prevents the aforesaid operation of the other during that interval.

16. In synchronizing apparatus, the combination of moving records adapted to be operated in synchronism, one of said records being controllable to travel faster and slower than its normal synchronous speed, means operable at intervals by one of the records to move the controllable record faster until said means is released, means operable at corresponding intervals by the other record to move the controllable record slower until said means is released, and means operable at intervals by each record to release the speed-adjusting means controlled by the other record.

17. In synchronizing apparatus, the combination of moving records adapted to be operated in synchronism, one of said records being controllable to travel faster and slower than its normal synchronous speed, means operable at intervals by one of the records to move the controllable record faster until said means is released, means operable at corresponding intervals by the other record to move the controllable record slower until said means is released, said means being adapted to neutralize each other when operated simultaneously due to the records being in synchronism, and means by each record operable at intervals thereby to release the speed-adjusting means controlled by the other record.

18. In synchronizing apparatus, the combination of moving records adapted to be operated in synchronism, one of said records being controllable to travel faster and slower than its normal synchronous speed, means operable at intervals by one of the records to move the controllable record faster until said means is released, means operable at corresponding intervals by the other record to move the controllable record slower until said means is released; and means, operated along with the aforesaid means, which, when operated with either of them during a given interval, prevents the aforesaid operation of the other during that interval, and means operable at intervals by each record to release the speed-adjusting means controlled by the other record.

19. In synchronizing apparatus, the combination of moving records adapted to be operated in synchronism, one of said records being controllable to travel faster and slower than its normal synchronous speed, means operable at intervals by one of the records to move the controllable record faster until said means is released, means operable at corresponding intervals by the other record to move the controllable record slower until said means is released, said means being adapted to neutralize each other when operated simultaneously due to the records being in synchronism; and means, operated along with the aforesaid means, which, when operated with either of them during a given interval, prevents the aforesaid operation of the other during that interval, and means operable at intervals by each record to release the speed-adjusting means controlled by the other record.

20. In a pneumatically operated musical instrument, the combination of a valve-chest, a duct leading therefrom, a main valve in said valve-chest controlling the admission of atmosphere into or the exhaustion of air from said duct, a pneumatic for operating said valve, means for locking the main valve in the position wherein it admits atmosphere into its duct and into its operating pneumatic, comprising a duct connecting said pneumatic with said duct controlled by the main valve, a duct-connection between said pneumatic and the exhaust, and valve means normally interrupting said connection.

21. In a pneumatically operated musical instrument, the combination of a valve-chest, a duct leading therefrom, a main valve in said valve-chest controlling the admission of atmosphere into or the exhaustion of air from said duct, a pneumatic for operating said valve, means for locking the main valve in the position wherein it admits atmosphere into its duct and into its operating pneumatic, comprising a duct connecting said pneumatic with said duct controlled by the main valve, a duct-connection between said pneumatic and the exhaust, a pneumatic which is normally on atmosphere acting as a valve to interrupt said connection, and additional valve means controlling the connection of said last named pneumatic with the atmosphere or exhaust.

Signed at New York city, in the county of New York, and State of New York, this 29th day of April, A. D. 1913.

JOSEPH H. DICKINSON.

Witnesses:
GEORGE B. KELLY,
EDITH L. ROBINSON.

---

It is hereby certified that in Letters Patent No. 1,314,578, granted September 2, 1919, upon the application of Joseph H. Dickinson, of Cranford, New Jersey, for an improvement in "Combined Talking-Machines and Pianos," errors appear in the printed specification requiring correction as follows: Page 6, line 64, strike out the word "corresponding"; page 8, line 106, claim 17, commencing with the word "by" strike out all to and through the word "thereby" line 107, and insert the words *operable at intervals by each record;* and that the said Letters Patent should be read with these corrections therein that the same may conform to the record of the case in the Patent Office.

Signed and sealed this 2d day of December, A. D., 1919.

[SEAL.]

M. H. COULSTON,
*Acting Commissioner of Patents.*

Cl. 84—193.